HENRY YOST.
Improvement in Steam Superheaters.
No. 123,542.   Patented Feb. 6, 1872.
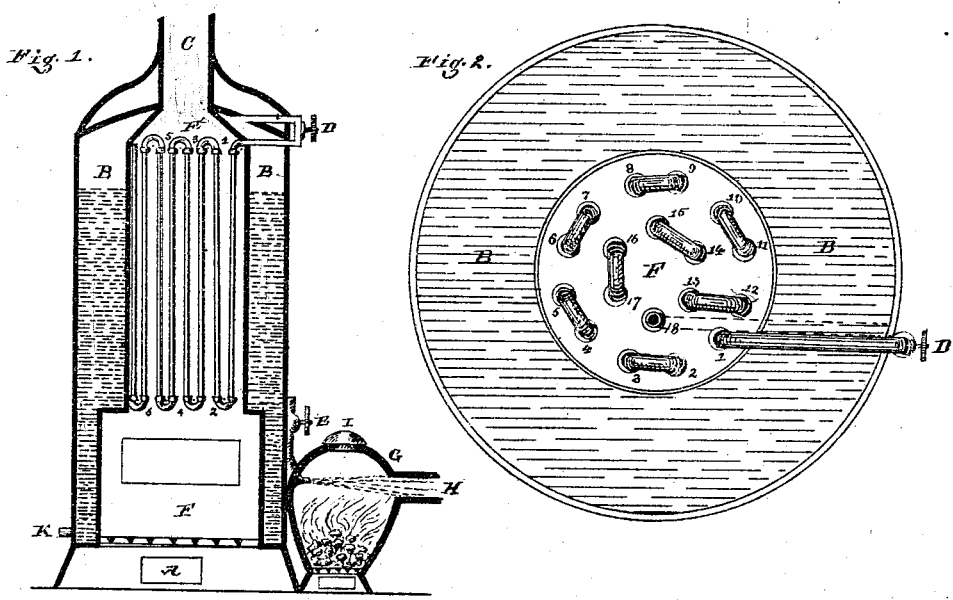
Witnesses.
Thos. Mullen
Benj. F. Mullen
Inventor
Henry Yost 123,542

UNITED STATES PATENT OFFICE.

HENRY YOST, OF COLUMBIA, PENNSYLVANIA.

IMPROVEMENT IN STEAM SUPERHEATERS.

Specification forming part of Letters Patent No. 123,542, dated February 6, 1872.

*To all whom it may concern:*

Be it known that I, HENRY YOST, of Columbia, in the county of Lancaster and State of Pennsylvania, have invented a new and Improved Combination in Steam-Generators, of which the following is a description, reference being had to the accompanying drawing making part of this specification.

Figure 1 is a vertical section. Fig. 2 is a cross-section, above the continuous pipe, on an enlarged scale; Fig. 3, a portion of the continuous steam-pipe, joined alternately.

Fig. 1 represents the vertical boiler, which consists of the ash-box A; the fire-box and grate F; the water-space B, shown to extend around the fire-pot or furnace F to the grate. An injector of the ordinary kind in use can be attached at K. Above the fire-box the water-space is widened, say, from three to six inches. There is a central open space, say, eighteen inches, which I will call the caloric-chamber F'. This is open from the fire-pot F to the flue C that leads to the smoke-stack. This annular water-case or boiler B may be made in a single section, and connected to the dome and furnace in the ordinary manner. The steam generated passes out through the top into a pipe, which is carried to the outside of the boiler and provided with a valve, D, and with a short turn entered back to connect with a vertical pipe marked 1, Fig. 2.

The steam passes down within the caloric chamber, and below connects with No. 2, passes up 2 and down 3, and so on, coming up 12; it crosses to an inner series, 13, down and up 14, thus passing up and down this connected series of pipes, subjected to the heat within the caloric-chamber F', thereby becoming superheated, and may be conveyed at this high temperature, say, 315° Fahrenheit, to the steam-chest, in like manner as ordinary steam is worked, but with a much-increased power or expansion.

For producing a still greater heat, and generating dry hot air, to be applied to heating purposes, I connect a small furnace, G, Fig. 1, in such a manner that the lower end of the continuous pipe is brought outside, and provided with a valve, E. This pipe is turned down and outward within the furnace G, above the ignited fuel in the furnace, into which it blows, expands, and escapes through an opposite enlarged pipe, H, to be carried to any desired point for heating dwellings or kitchen-ranges, or purposes to which the superheated steam can be applied.

It is believed that by this combination a valuable generator, on a small scale, will be sufficient to propel sewing-machines or for driving one or two horse-power engines for farm or shop work. The fuel or heat that generates the steam is utilized to superheat the same, and thereby perform its work more highly expanded.

I do not claim a vertical boiler with an inner flue open to the fire-pot; nor do I claim a coil or continuous steam-pipe for superheating steam, separately considered, as such have been used before.

What I claim as my invention, and desire to secure by Letters Patent, is—

1. I claim the furnace G, with its outlet H, opposite a steam-jet nozzle, substantially as and for the purpose set forth.

2. In combination with my furnace G, I claim the use of a portable steam-generator, substantially made in the manner shown, and for the purpose specified.

HENRY YOST.

Witnesses:
 THOS. MULLEN,
 BENJ. F. MULLEN.